(12) United States Patent
Pathak et al.

(10) Patent No.: US 11,019,044 B2
(45) Date of Patent: May 25, 2021

(54) CORRELATING NETWORK FLOWS THROUGH A PROXY DEVICE

(71) Applicant: Gigamon Inc., Santa Clara, CA (US)

(72) Inventors: Manish Pathak, San Jose, CA (US); Kishor Joshi, Milpitas, CA (US); Murali Bommana, Fremont, CA (US)

(73) Assignee: Gigamon Inc., Santa Clara, CA (US)

( * ) Notice: Subject to any disclaimer, the term of this patent is extended or adjusted under 35 U.S.C. 154(b) by 133 days.

(21) Appl. No.: 16/297,346

(22) Filed: Mar. 8, 2019

(65) Prior Publication Data

US 2020/0287881 A1 Sep. 10, 2020

(51) Int. Cl.
*H04L 29/06* (2006.01)
*H04L 29/08* (2006.01)
*H04L 9/08* (2006.01)

(52) U.S. Cl.
CPC .......... *H04L 63/062* (2013.01); *H04L 9/0819* (2013.01); *H04L 63/0823* (2013.01); *H04L 67/02* (2013.01); *H04L 69/163* (2013.01)

(58) Field of Classification Search
CPC ... H04L 63/062; H04L 63/0823; H04L 67/02; H04L 69/163; H04L 9/0819
See application file for complete search history.

(56) References Cited

U.S. PATENT DOCUMENTS

| 9,742,806 | B1 | 8/2017 | Rothstein et al. | |
|---|---|---|---|---|
| 2004/0030927 | A1* | 2/2004 | Zuk | H04L 63/0254 713/160 |
| 2005/0050316 | A1 | 3/2005 | Peles | |
| 2006/0248582 | A1* | 11/2006 | Panjwani | H04L 47/10 726/13 |
| 2007/0248084 | A1* | 10/2007 | Whitehead | H04L 67/14 370/389 |
| 2008/0126794 | A1* | 5/2008 | Wang | H04L 63/0823 713/151 |
| 2009/0013399 | A1* | 1/2009 | Cottrell | H04L 63/0421 726/12 |

(Continued)

OTHER PUBLICATIONS

Gigamon , "Deployment Guide: Flexible Inline Arrangements GigaVUE-OS 5.3", Jun. 5, 2018 (Jun. 5, 2018) Retrieved on Apr. 28, 2020 (Apr. 28, 2020) from <https://www.gigamon.com/content/dam/resource-library/english/deployment-guide/flexibleInline-deploymentGuide.pdf>, Jun. 5, 2018.

(Continued)

*Primary Examiner* — Matthew T Henning
(74) *Attorney, Agent, or Firm* — Perkins Coie LLP

(57) ABSTRACT

A network appliance stores a session identifier that uniquely identifies a network communication session between a first device and the network appliance. A first communication is received from the first device over the network communication session. The network appliance also receives from a proxy tool, a second communication that includes a header specifying the session identifier and that includes data generated by the proxy in response to the first communication. The network appliance associates the first communication with the second communication using the session identifier. An encrypted representation of the data generated by the proxy is transmitted to a second device based on the association between the first communication and the second communication.

26 Claims, 5 Drawing Sheets

(56) References Cited

U.S. PATENT DOCUMENTS

| | | | | |
|---|---|---|---|---|
| 2009/0249465 | A1* | 10/2009 | Touboul | H04W 12/12 |
| | | | | 726/11 |
| 2011/0231649 | A1 | 9/2011 | Bollay et al. | |
| 2014/0029617 | A1* | 1/2014 | Wang | H04L 47/10 |
| | | | | 370/392 |
| 2014/0115702 | A1* | 4/2014 | Li | H04L 9/3273 |
| | | | | 726/23 |
| 2015/0113264 | A1 | 4/2015 | Wang et al. | |
| 2015/0143453 | A1* | 5/2015 | Erb | H04L 63/10 |
| | | | | 726/1 |
| 2018/0034839 | A1* | 2/2018 | Ahuja | H04L 63/1408 |
| 2018/0248778 | A1* | 8/2018 | Vinsel | H04L 69/22 |
| 2018/0278419 | A1* | 9/2018 | Higgins | H04L 9/0841 |
| 2019/0124123 | A1* | 4/2019 | Higgins | H04L 63/061 |

OTHER PUBLICATIONS

Heder, Brian, "What's lurking in your network? Find out by decrypting SSL", In: Network World. Jan. 18, 2013 (Jan. 18, 2013) Retrieved on Apr. 28, 2020 (Apr. 28, 2020) from <https ://www. networkworld. com/a rti cle/2163 739/what-s-l urking-in-your -network-- fi nd-out-by-dec rypting-ssl.html>, Jan. 18, 2013.

International Search Report and Written Opinion dated May 20, 2020 for PCT/US2020/020546 filed on Feb. 29, 2020, 13 pages, dated May 20, 2020.

* cited by examiner

US 11,019,044 B2

CORRELATING NETWORK FLOWS THROUGH A PROXY DEVICE

TECHNICAL FIELD

This disclosure relates generally to network communications, and in particular to correlating network communications transmitted to and from a proxy device.

BACKGROUND

Traffic in a computer network can be analyzed to improve real-time decision-making for network operations, security techniques, or other considerations. Given the complexity and volume of traffic routed through many infrastructures, various types of network tools are often used to analyze the network traffic. These network tools typically analyze unencrypted or plaintext data, while other communications in the computer network are typically encrypted. In some cases, encrypted data transmitted from a first device in the network to a second device is intercepted by an inline network appliance, decrypted, and transmitted to a network tool for analysis. The tool returns an unencrypted communication to the network appliance, which generates an encrypted communication to transmit to the second device. The network appliance typically matches communications among the tool, client, and server based on each communication's "5-tuple," specifying source and destination ports, source and destination IP addresses, and protocol used by the communication. However, because the network tool uses a different IP address than the first device, the network appliance typically cannot associate the communication from the network tool with the communication from the first device based on the 5-tuple. If the communication from the network tool is not matched to a communication from the first device, the network appliance cannot generate the encrypted communication to transmit to the second device.

DETAILED DESCRIPTION

A network appliance that operates inline to network communication between a client device and a server intercepts a data stream including one or more data packets transmitted between the client device and server and transmits the packets (or a copy of the packets) to an inline network tool. The network tool analyzes the data packets and returns one or more of the packets to the network appliance. Based on the proxy response, the network appliance transmits one or more data packets to the client or server. To associate the proxy response with the original data stream from the client or server, and therefore to correctly route the proxy response to an intended target, the network appliance appends a session identifier to the data packets transmitted to the proxy. The proxy response similarly includes the session identifier, and the network appliance associates the proxy response with the original data stream using the session identifier.

Figure 1:
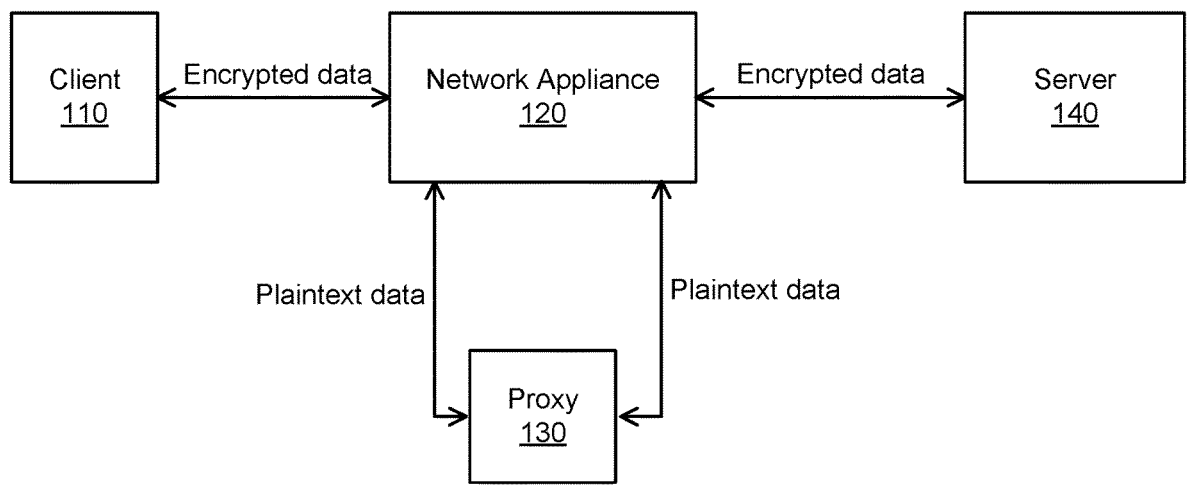
FIG. 1 illustrates an example environment in which a network appliance operates.

FIG. 1 illustrates an example environment 100 in which a network appliance operates. As shown in FIG. 1, the environment 100 can include a client device 110, a network appliance 120, a proxy 130, and a server 140. Other embodiments of the environment 100 can include additional or different devices. For example, multiple clients 110 and/or multiple servers 140 can communicate in the environment 100 through the network appliance 120, or multiple proxies 130 can receive and analyze data from the network appliance 120. The client device 110, network appliance 120, proxy 130, and server 140 may transmit data streams through various intermediate devices not shown in FIG. 1, such as routers or network switches. Furthermore, data streams between the devices can be transmitted by wired or wireless connections over networks such as one or more local area networks (LANs), wide-area networks (WANs), metropolitan area networks (MANs), and/or the Internet.

The client device 110 communicates with the server 140, transmitting data packets to or receiving data packets from the server 140 in a networked communication session. In some embodiments, the client device 110 is a device used by a user to request content from the server 140, such as a laptop or desktop computer, mobile phone, or tablet. However, the client device 110 can additionally or alternatively be any of a variety of other computer devices such as another server or a node in the networked environment.

The server 140 similarly can transmit data packets to or receive data packets from the client device 110 in a networked communication session. In response to requests received from the client device 110, the server 140 can serve content to the client device 110. For example, the server 140 can be a web server configured to serve a requested webpage to the client 110.

The proxy 130 is a network tool that can be configured to analyze data packets transmitted between the client 110 and server 140, monitor traffic within the computer network, and/or attempt to block or stop the transmission of abnormal or malicious data packets. In some embodiments, the proxy 130 may analyze the data packets to determine whether the data packets comply with one or more policies. A policy can, for example, include heuristics or learned models that indicate whether a data packet is abnormal or malicious. Another example policy can determine whether a data packet complies with a network use guideline of an enterprise. If a data packet does not comply with the one or more policies, the proxy 130 may modify the packet or block its transmission. In some cases, the proxy device 130 effectively separates the client 110 and server 140, removing or modifying data packets transmitted between the devices to perform tasks such as access control, web caching, and content filtering.

The proxy 130 can be located physically remote from the network appliance 120. For example, the network appliance 120 can include a housing that physically encloses its components, while the proxy 130 has a separate housing that physically encloses its components and is remote from the appliance housing. The proxy 130 can communicate with the network appliance 120 by a wired or wireless connection.

The network appliance 120 intercepts data packets transmitted between the client device 110 and server 140 and routes the packets to the proxy 130 for analysis before passing the packets (as modified by the proxy 130, if relevant) to their targeted destination. The network appliance 120 can be configured as a node in a computer network that can receive data packets from one or more other nodes in the network, such as the client device 110 and server 140. The network appliance 120 can operate in an inline mode within a data path between a sending endpoint node (e.g., the client 110) and a receiving endpoint node (e.g., the server 140), receiving data packets from the sending endpoint node and forwarding at least some of the original data packets to the receiving endpoint node. The network appliance 120 can determine which data packets to forward to the endpoint node based on the analysis by the proxy 130.

Data packets can be received and transmitted by the network appliance 120 at physical network ports of the appliance, and multiple network ports can be coupled to different nodes in the computer network. Embodiments of the network appliance 120 can be, for example, a monitoring platform that includes a chassis and interchangeable blades offering various functionalities, such as enhanced packet distributed and masking/filtering capabilities.

Messages between the client device 110 or server 140 and the network appliance 120, each including one or more data packets, can be encrypted. In some embodiments, the network appliance 120 can establish a secure network connection with the client device 110 and exchange data with the client device 110 that is encrypted using a first private key. The network appliance 120 can similarly establish a secure network connection with the server 140 and exchange data with the server 140 that is encrypted using a second private key. The secure connections between the network appliance 120, client 110, and server 140 can be enabled by a protocol such as transport layer security (TLS) or secure sockets layer (SSL).

Data streams between the network appliance 120 and proxy 130 can be plaintext, unencrypted data. To communicate with the proxy 130, the network appliance 120 can decrypt the data received from the client device 110 or server 140 using, respectively, the first private key and the second private key. The decrypted communications can be transmitted to the proxy 130 for analysis, and the proxy 130 can return similarly unencrypted communications to the network appliance 120 based on the proxy's analysis.

To match the data streams received from the proxy 130 to data streams received from the client 110 and server 140, the network appliance 120 generates a session identifier that uniquely identifies the network communication session between the appliance 120 and client 110, the communication session between the appliance 120 and server 140, or both. The session identifier can, for example, identify the client 110, the server 140, both the client and server, the connection(s) between the network appliance 120 and either or both of client 110 or the server 140, a security parameter used in the data stream between the network appliance 120 and the client device 110 or the server 140, or other information about the client and/or server. In some embodiments, the network appliance 120 generates the session identifier by generating an encoded representation, such as a hash, of identifiers of the client 110, server 140, and/or communications between the devices. In other embodiments, the packet processor 205 generates the session identifier by generating a random string. The generated string can be mapped to information such as the identifier of the client 110, the server 140, or at least one of the communication sessions of the network appliance 120.

Figure 2:
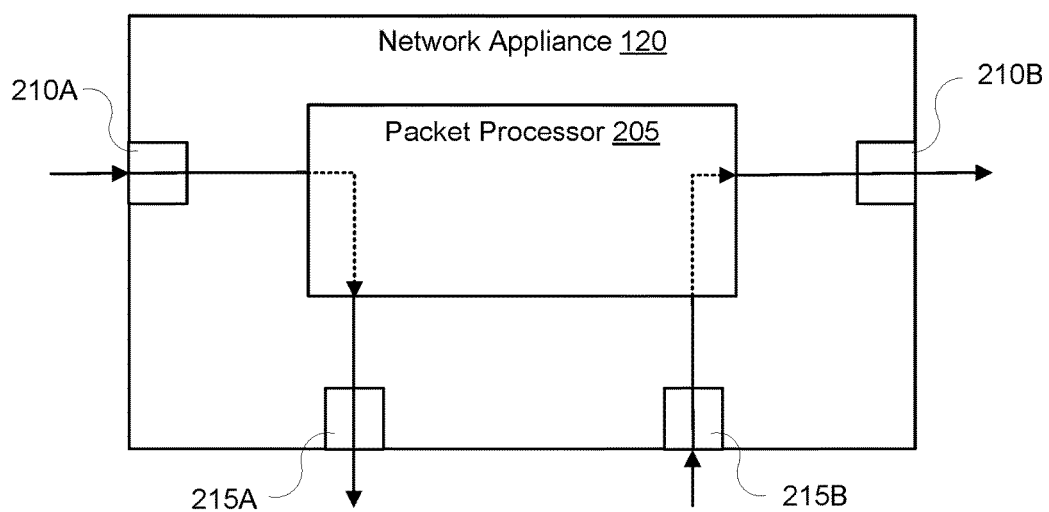
FIG. 2 is a block diagram that illustrates one embodiment of a network appliance.

FIG. 2 is a block diagram that illustrates one embodiment of the network appliance 120. As shown in FIG. 2, the network appliance 120 can include a packet processor 205, a first network port 210A, a second network port 210B, a first tool port 215A, and a second tool port 215B.

The network ports 210 are communicatively coupled to the client 110 and server 140 to receive data from or transmit data to the client 110 and server 140. For example, the network port 210A is communicatively coupled to the client 110, while the network port 210B is communicatively to the server 140. In some embodiments, the network ports 210 can be physical ports in a housing containing the network appliance 120. In other embodiments, the network ports 210 represent virtual ports that may be combined as part of one or more physical ports. For example, the network port 210A and the network port 210B may be part of a single physical port in the housing of the network appliance 120. Similarly, the network ports 210 can be aggregates of multiple physical ports. For example, each port 210 shown in FIG. 2 can represent a group of physical ports used as a single packet transmission channel through link aggregation.

The tool ports 215 can receive data from or output data to one or more network tools, such as the proxy 130. Like the network ports 210, the tool ports 215 can be physical ports in the network appliance 120 housing, virtual ports, or a combination of physical and virtual ports. In some embodiments, each tool port 215 is configured to receive data from a tool or output data to a tool. For example, FIG. 2 shows that the tool port 215A outputs data to a tool while the tool port 215B receives data from the tool.

The packet processor 205 routes data packets between the network ports 210 and/or tools ports 215. The packet processor 205 can have a hardware processor such as a central processing unit or a microprocessor, and can include or be coupled to a memory that stores computer program instructions executable by the hardware processor. In some embodiments, the packet processor 205 applies a packet routing rule stored in the memory to determine how to handle a data packet received at the network appliance 120. The rule can cause the packet processor 205 to forward a data packet to a specified location, such as a specified tool port 215 or network port 210. In some cases, the rule can also cause the packet processor 205 to process a data packet in a specified manner, such as aggregating the data packet with another data packet, removing the data packet from the network traffic, or modifying the packet (e.g., by adding a header to the packet, removing a header, or removing a payload).

The packet processor 205 associates data streams transmitted to the proxy 130 with data streams received from the proxy 130 using a session identifier. The session identifier can be stored in the memory. When transmitting one or more packets to the proxy 130, the packet processor 205 appends a header to the message that includes the session identifier. The proxy 130 applies the header to any messages the proxy transmits to the network appliance 120, and the packet processor 205 can extract the session identifier from the header of any message received from the proxy 130. By extracting the session identifier from the header of any message received from the proxy 130, the packet processor 205 can associate the received message with the message transmitted to the proxy 130.

Figure 3A:
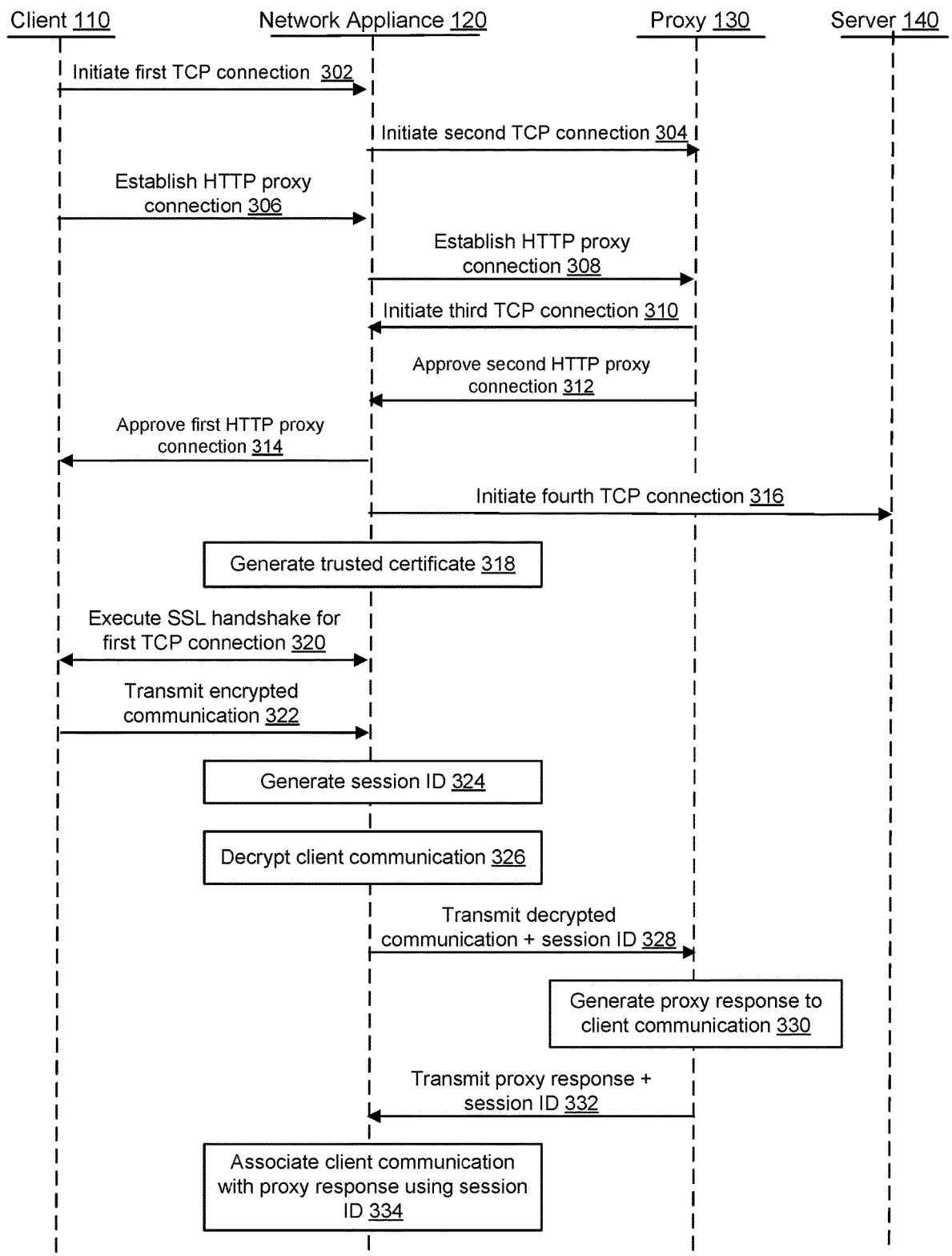
FIGS. 3A-3B are an interaction diagram illustrating a process for correlating communications transmitted between a client and server.
Figure 3B:
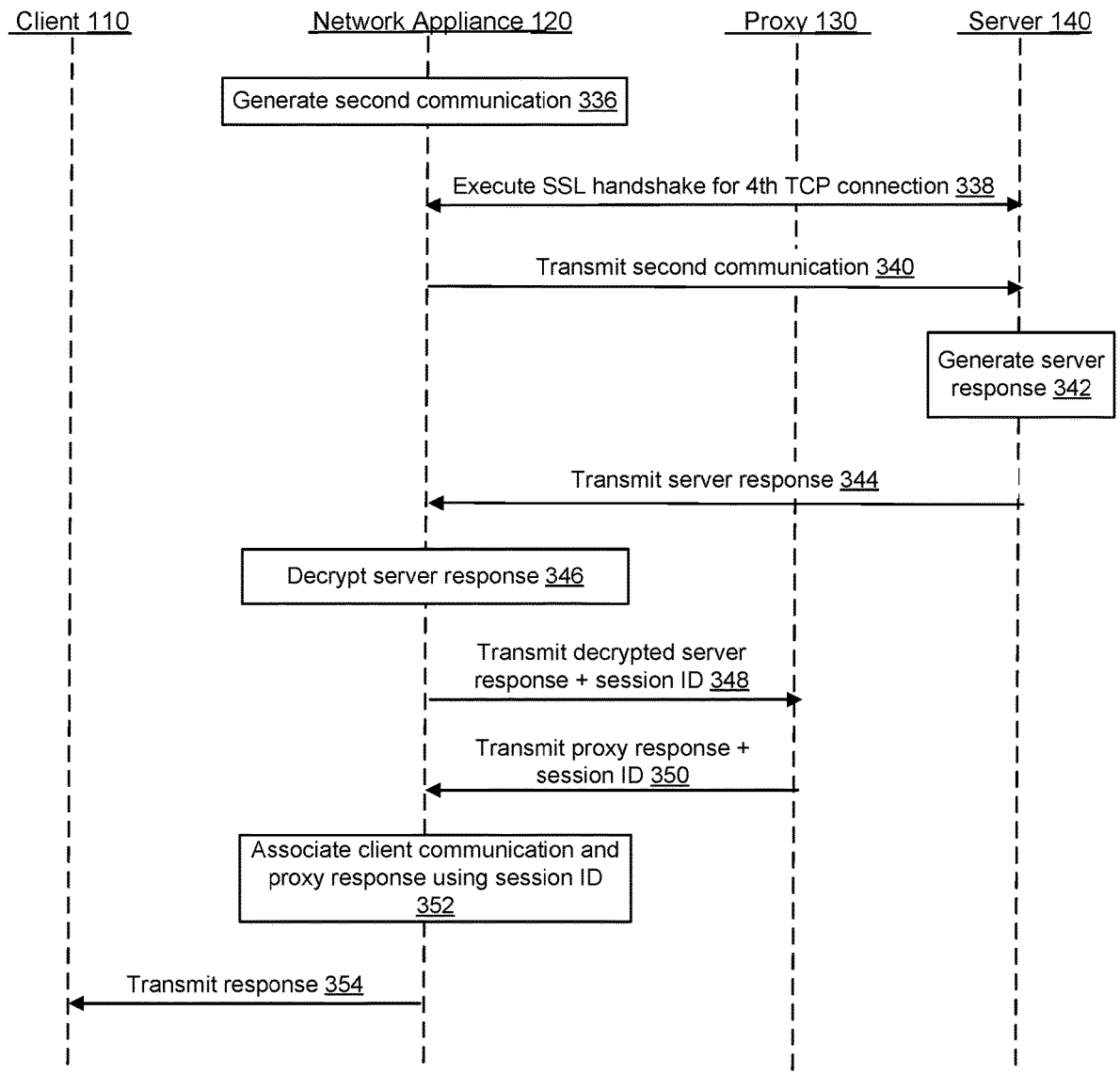

FIGS. 3A-3B show a process for correlating data streams transmitted between a client 110 and a server 140, according to one embodiment. As shown in FIGS. 3A-3B, the process can include interactions between the client 110, the network appliance 120, the proxy 130, and the server 140. Other embodiments can include additional, fewer, or different steps, and the steps can be performed in different orders. Furthermore, although references are made to specific communications protocols, other embodiments of the process can use different protocols for communication between the devices.

Referring to FIG. 3A, the client device 110 initiates 302 a first transmission control protocol (TCP) connection to the network appliance 120. For example, the client 110 and network appliance 120 complete a three-way handshake (3WHS) that establishes a first network connection between the client and appliance. The network appliance 120 similarly initiates 304 a second TCP connection to the proxy 130. After establishing the first and second TCP connections, the client device 110 establishes 306 an HTTP connection with the network appliance 120 over the first TCP connection, and the network appliance 120 establishes 308 an HTTP connection with the proxy 130 over the second TCP connection.

The proxy 130 can initiate 310 a third TCP connection from the proxy to the network appliance 120, using, for example, the 3WHS procedure. The proxy 130 can also return a response to the network appliance 120 approving 312 the second HTTP connection. The network appliance 120 returns a response to the client 110 approving 314 the first HTTP connection.

The network appliance 120 can initiate 316 a fourth TCP connection between the appliance and the server 140. By communicating with the client 110 over the first TCP connection and the server 140 over the fourth TCP connection, the network appliance 120 can effectively isolate the client from the server. For example, the network appliance 120 can intercept data streams from the server 140 and analyze them before serving them to the client 110. The network appliance 120 therefore can effectively simulate the role of the server 140 to the client 110 and the role of the client to the server.

To act as the server to the client 110, the network appliance generates 318 a trusted security certificate. The security certificate authenticates an identity of the network appliance 120, and can be signed by a trusted certificate signing authority. Using the generated certificate, the network appliance 120 and client 110 execute 320 a handshake to establish encrypted data streams between the devices. For example, the network appliance 120 and client 110 execute an SSL handshake in which the client 110 validates the certificate generated by the appliance and the appliance 120 and client 110 generate a first encryption key for encrypting data streams between the devices.

The client 110 can transmit 322 an encrypted data stream over the first network connection between the client and the network appliance 120. For example, the client 110 can transmit a request for content from the server 140. In response to receiving the first data stream, the network appliance 120 generates 324 a session identifier that uniquely identifies the network communication session(s) among the client 110, the appliance 120, and the server 140.

The network appliance 120 decrypts 326 the data stream received from the client and transmits 328 the decrypted data stream to the proxy 130. A header containing the session identifier is appended to the decrypted data stream.

When the proxy 130 receives the decrypted data stream, the proxy can generate 330 a proxy response to the data stream. The proxy response can be generated based on analysis of the data stream received from the client, and can include, for example, removing or modifying one or more data packets in the data stream received from the client or passing through all data packets without modification. The proxy 130 transmits 332 the proxy response to the network appliance 120, appending a header to the proxy response that includes the session identifier.

Using the session identifier extracted from the proxy response, the network appliance 120 associates 334 the proxy response to the data stream received from the client 110. Associating the proxy response to the client data stream enables the network appliance 120 to match the data streams and pass the client data stream to the server 140 based on any modifications applied by the proxy 130. For example, if the client 110 requested to access a webpage and the proxy 130 approves the access to the webpage, the network appliance 120 determines that the client request can be passed to the server 140 in response to the approval from the proxy 130.

Based on the proxy response, the network appliance 120 generates 336 a data stream to transmit to the server 140. The data stream can be generated 336 based on the data stream from the client and/or the proxy response. For example, if the proxy 130 modified or removed data packets from the client data stream, the network appliance 120 can generate a data stream to the server that includes the modified set of data packets. The network appliance 120 can also re-encrypt data using the second encryption key, before transmitting 340 the second data stream to the server 140 over the fourth TCP connection.

In response to associating the proxy response with the data stream received from the client, the network appliance 120 executes 338 a handshake with the server 140 to establish an encrypted communication session over the fourth TCP connection, between the network appliance 120 and the server 140. Like the handshake between the client 110 and network appliance 120, the network appliance 120 and server 140 can execute, for example, an SSL handshake in which the network appliance 120 and the server 140 generate a second encryption key for encrypting communications between the devices.

The server 140 receives the second data stream from the network appliance 120 and generates 342 a server response to the second data stream. For example, if the second data stream includes a request for content such as a webpage, the server 140 can generate a response including the requested content. The server transmits 344 the response to the network appliance 120 over the fourth TCP connection.

The network appliance 120 receives the server response and decrypts 346 using the second encryption key. The decrypted server response is appended to a header including the session identifier and transmitted 3448 to the proxy 130 for analysis. The proxy 130 returns 350 a response to the network appliance 120, with the session identifier in the header of the response.

Using the session identifier extracted from the proxy response, the network appliance 120 associates 352 the proxy response with the original data stream received from the client 110 and identifies the proxy response as a response to the client data stream. The network appliance 120 generates a response based on the proxy response, and transmits 354 the generated response to the client 110.

Example Network Appliance

Figure 4:
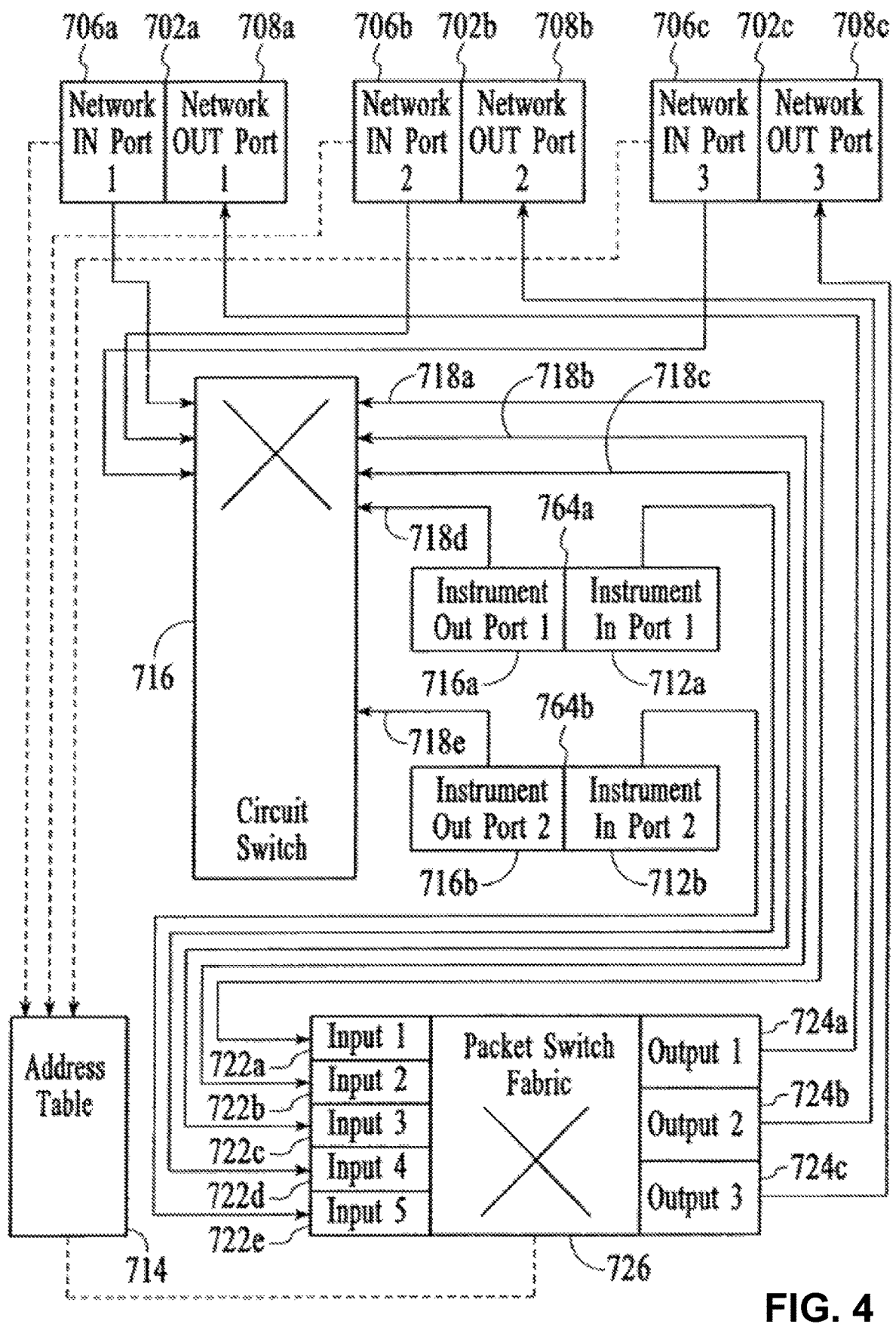
FIG. 4 is a simplified functional diagram of one example network appliance.

FIG. 4 is a simplified functional diagram of one example network appliance 120. The embodiment comprises three network ports 702a-c and two instrument ports 704 a-b. Each network port 702a-c comprises a network in port 706a-c and a network out port 708a-c. Each instrument port 704a-b comprises an instrument in port 712a-b and an instrument out port 710a-b. Referring to FIG. 4, a first network port 702a comprises a first network in port 706a and a first network out port 708a. A second network port 702b comprises a second network in port 706b and a second network out port 708b, and a third network port 702c comprises a third network in port 706c and a third network out port 708c. Further, a first instrument port 704a comprises a first instrument in port 712a and a first instrument out port 710a, and a second instrument port 704b comprises a second instrument in port 712b and a second instrument out port 710b. In operation, a network port is linked to and in communication with a set of terminals in the packet-switching network. The source addresses of the ingress packets originated from these terminals and received at the network in port of the network port are the terminal addresses of these terminals. The embodiment analyzes each ingress packet that the network in port of each network port receives. Further, the embodiment updates address Table 714 to include the source address of each ingress packet received at each network port and associate that network port with that source address, which is also the terminal address of a terminal that is linked to that network port. The terminal addresses associated with each network port are removed from address table 714 according to a predetermined strategy.

The ingress packets are directed from each network in port 706a-c to the corresponding circuit switch inputs of circuit switch 716. In FIG. 4, the circuit switch inputs of circuit switch 716 are shown on the left side of the circuit switch block and the circuit switch outputs of circuit switch 716 are shown on the right side of the circuit switch block. Circuit switch 716 is an example implementation of a mux-switch. A mux-switch comprises a plurality of mux-switch inputs and a plurality of mux-switch outputs. The functions of the mux-switch include but are not limited to, aggregating the packet traffic from multiple mux-switch inputs to a mux-switch output, or directing the packet traffic from a mux-switch input to a mux-switch output, or broadcasting the packet traffic from a mux-switch input to multiple mux-switch outputs, or a combination thereof. The circuit switch input of circuit switch 716 is a mux-switch input. The circuit switch output of circuit switch 716 is a mux-switch output. The mux-switch may be manually controlled or program controlled so that, for example, the packet traffic pattern in the mux switch is reconfigurable.

Circuit switch 716 functions as a circuit cross connect switch, in which circuit switch 716 directs the packet traffic from a circuit switch input to a circuit switch output. Optionally, circuit switch 716 aggregates the packet traffic from multiple circuit switch inputs to a circuit switch output, or circuit switch 716 directs the packet traffic from a circuit switch input to one circuit switch output, or circuit switch 716 multicasts the packet traffic from a circuit switch input to multiple circuit switch outputs, or circuit switch 716 aggregates the packet traffic from multiple circuit switch inputs and multicasts the aggregated packet traffic to multiple circuit switch outputs, or a combination thereof. The circuit switch 716 shown in FIG. 4 comprises five circuit switch outputs 718a-e. The packet traffic from at least one of the circuit switch outputs 718a-e is directed to a first instrument out port 710a. The packet traffic from the other circuit switch outputs 718a-e may be directed to other instrument out ports, for example, a second instrument out port 710b, or directed to the inputs 722a-e of packet switch fabric 720. Direct packet traffic from circuit switch 716 to packet switch fabric 720 is optional, and the second instrument out port 710b is optional. The packet traffic from instrument in ports, for example, first instrument in port 712a and second instrument in port 712b, are directed to the inputs of packet switch fabric 720. Second instrument in port 712b is optional.

Packet switch fabric 720 examines the destination address of each packet it receives from its inputs 722a-e; and looks up the identity of the network port that is associated with the destination address of the packet in address table 714. If the destination address of the packet is in address table 714, packet switch fabric 720 routes the packet to the network out port of the network port that is associated with the destination address in address table 714 through one of its outputs 724a-c; otherwise, packet switch fabric 720 broadcasts the packet to the network out ports of a predetermined selection of network ports. This predetermined selection may include no network port, or at least one network port, or all network ports.

Figure 5:
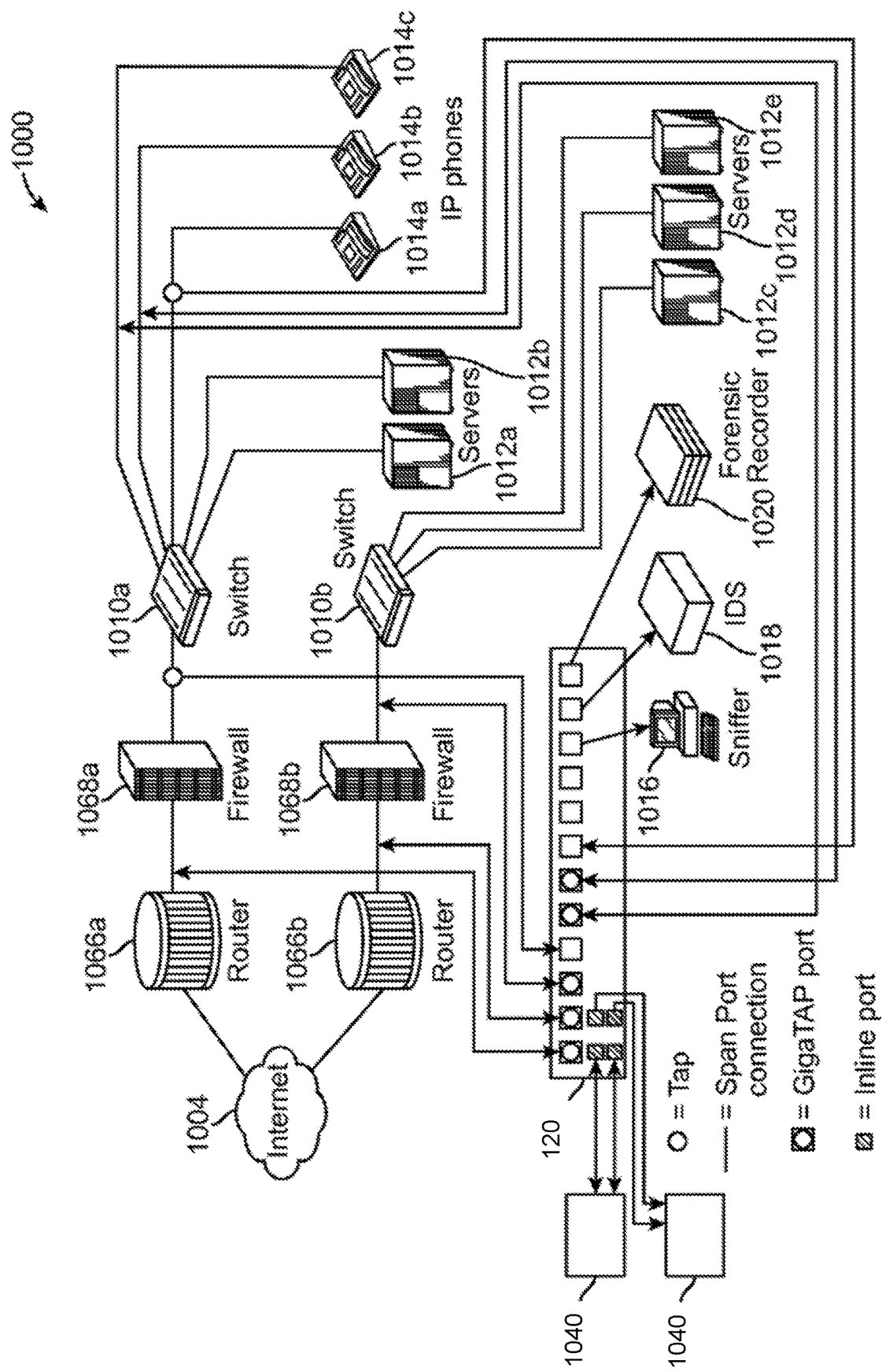
FIG. 5 shows an example deployment of the network appliance in a network environment.

FIG. 5 shows an example deployment of the network appliance 120 in a network environment 1000 in accordance with some embodiments. The Internet 1004 is coupled via routers 1006a-b and firewalls 1068a-b to two switches 1010a and 1010b. Switch 1010a is coupled to servers 1012a-b and IP phones 1014a-c. Switch 1010b is coupled to servers 1012c-e. A sniffer 1016, an IDS 1018 and a forensic recorder 1020 (collectively, "non-pass through instruments") are coupled to the device 300. As illustrated in FIG. 5, there is a reduction on the number of non-pass through instruments in this deployment as compared to a conventional configuration (in which there may be one or more non-pass through instruments between router 1066a and firewall 1068a, one or more non-pass through instruments between firewall 1068a and switch 1010a, one or more non-pass through instruments between router 1066b and firewall 1068b, and firewall 1068b and switch 1010b) because the same non-pass through instruments can now access information anywhere in the network environment 1000 through the device 100. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 1014a-c can be easily configured to be sent to an IDS 1018. It is also possible that traffic inside a particular IP phone 1014a-c connection can be sent to a sniffer 1016, and Intrusion Detection System 1018 and a forensic recorder 1020 simultaneously via the one-to-many function. The packet processing features of the device 100 described herein allow the device 100 to process the packets based on a unified model to address any network monitoring requirements.

In some embodiments, when using the network appliance 120, one or more non-pass through instruments (such as IDS, sniffer, forensic recorder, etc.) may be connected to instrument port(s), and one or more pass through instruments 1040 (e.g., IPS) may be connected to other instrument port(s) (e.g., inline port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the network appliance 120, the appliance 120 can compare whether the IDS or the IPS sees more threats, and/or can have a redundant protection such that if the IPS misses any threat, the IDS may pick it up.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method comprising:
   receiving, at a network appliance that operates inline between a client and a server, encrypted data from the client, the encrypted data including a request for content from the server, the encrypted data received in a first communication session between the client and the network appliance;
   decrypting, by the network appliance, the received data to generate first plaintext data;
   generating, by the network appliance, a session identifier;
   transmitting a first communication to a proxy, the first communication including the first plaintext data and the session identifier;
   responsive to receiving a second communication from the proxy that includes the session identifier and second plaintext data, associating, by the network appliance, the second communication with the first communication based on the session identifier; and
   transmitting the request for content to the server based on the association between the first communication and the second communication, the request for content transmitted in a second communication session between the network appliance and the server.

2. The method of claim 1, wherein the data received from the client is encrypted using a first encryption key, and wherein transmitting the request for content to the server comprises encrypting the request for content using a second encryption key.

3. The method of claim 1, further comprising:
   receiving, from the server, an encrypted response generated by the server to the request for content;
   decrypting, by the network appliance, the received response;
   transmitting a third communication to the proxy, the third communication including the decrypted response and the session identifier;
   responsive to receiving a fourth communication from the proxy that includes the session identifier, associating, by the network appliance, the fourth communication with the third communication based on the session identifier; and
   transmitting at least a portion of the response generated by the server to the client based on the association between the third communication and the fourth communication.

4. The method of claim 1, further comprising:
   generating by the network appliance, a security certificate; and
   transmitting the security certificate to the client to generate an encrypted channel in the first communication session between the client and the network appliance.

5. The method of claim 1, wherein the proxy is implemented in a device remote from the network appliance.

6. The method of claim 1, wherein transmitting the first communication to the proxy comprises appending a header to the decrypted data, and wherein the header includes the session identifier.

7. A method comprising:
   storing at an inline network appliance, a session identifier that uniquely identifies a network communication session between a first device and the inline network appliance;
   receiving at the inline network appliance, a first communication from the first device in the network communication session;
   receiving from a proxy tool, a second communication that includes a header specifying the session identifier and that includes data generated by the proxy tool by modifying the first communication;
   associating, by the inline network appliance, the first communication with the second communication by using the session identifier; and
   transmitting an encrypted representation of the data generated by the proxy from the inline network appliance to a second device based on the association between the first communication and the second communication.

8. The method of claim 7, wherein the data received from the first device is encrypted using a first encryption key, and wherein transmitting the encrypted representation of the data to the second device comprises encrypting the data generated by the proxy using a second encryption key.

9. The method of claim 7, further comprising:
   receiving from the server, a response generated by the second device to the encrypted representation of the data generated by the proxy;
   generating a third communication for transmission to the proxy, the third communication including a header specifying the session identifier and the response generated by the second device;
   responsive to receiving a fourth communication from the proxy that includes the session identifier, associating, by the network appliance, the fourth communication with the third communication based on the session identifier; and
   transmitting an encrypted representation of the fourth communication to the first device based on the association between the third communication and the fourth communication.

10. The method of claim 7, wherein the first device is a client device, and wherein the method further comprises:
    generating by the network appliance, a security certificate; and
    transmitting the security certificate to the first device to generate an encrypted channel between the first device and the network appliance.

11. The method of claim 7, wherein the proxy is executed by a device remote from the network appliance.

12. The method of claim 7, further comprising generating the session identifier in response to receiving encrypted data from the first device.

13. A network appliance comprising:
    a processor; and
    a memory storing computer program instructions that, when executed by the processor, cause the network appliance to:
      store a session identifier in the memory that uniquely identifies a network communication session between a first device and the network appliance;
      receive a first communication from the first device;
      receive from a proxy, a second communication that includes a header specifying the session identifier and that includes data generated by the proxy by modifying the first communication;

associate the first communication with the second communication using the session identifier; and transmit to a second device based on the association between the first communication and the second communication, an encrypted representation of the data generated by the proxy.

14. The network appliance of claim 13, wherein the data received from the first device is encrypted using a first encryption key, and wherein transmitting the encrypted representation of the data to the second device comprises encrypting the data generated by the proxy using a second encryption key.

15. The network appliance of claim 13, wherein the computer program instructions when executed further cause the processor to:

receive from the client, a response generated by the server to the encrypted representation of the data generated by the proxy;

generating a third communication for transmission to the proxy, the third communication including a header specifying the session identifier and the response generated by the client;

responsive to receiving a fourth communication from the proxy that includes the session identifier, correlating, by the network appliance, the fourth communication to the third communication based on the session identifier; and transmitting an encrypted representation of the fourth communication to the server.

16. The network appliance of claim 13, wherein the first device is a client device, and wherein the computer program instructions when executed further cause the processor to:

generate by the network appliance, a security certificate; and transmit the security certificate to the first device to generate an encrypted channel between the first device and the network appliance.

17. The network appliance of claim 13, wherein the proxy is implemented in a device remote from the network appliance.

18. The network appliance of claim 13, wherein the computer program instructions when executed further cause the processor to generate the session identifier in response to receiving encrypted data from the client device.

19. The network appliance of claim 13, further comprising:

a first network port coupled to the first device;
a second network port coupled to the second device; and
a tool port coupled to the proxy.

20. The network appliance of claim 19, wherein the tool port comprises a first tool port configured to output data to the proxy and a second tool port configured to receive data from the proxy.

21. A network appliance operating inline between a client and a server, the network appliance comprising:

a plurality of physical ports, the plurality of physical ports including at least two network ports and at least one tool port;

a processor; and a memory storing computer program instructions that, when executed by the processor, cause the network appliance to:

receive at a first network port, encrypted data from the client, the encrypted data including a request for content from the server;

decrypt the received data to generate first plaintext data;

generate a session identifier;

transmit, by the at least one tool port, a first data stream to a proxy, the first data stream including the first plaintext data and the session identifier;

responsive to receiving, by the at least one tool port, a second data stream from the proxy that includes the session identifier and second plaintext data, associate the second data stream with the first data stream based on the session identifier; and transmit, by a second network port, the request for content to the server based on the association between the first data stream and the second data stream.

22. The network appliance of claim 21, wherein the first data stream includes at least one data packet, and wherein the proxy processes the at least one data packet and returns the at least one data packet after processing to the network appliance in the second data stream.

23. The network appliance of claim 21, wherein the data received from the client is encrypted using a first encryption key, and wherein transmitting the request for content to the server comprises encrypting the data generated by the proxy using a second encryption key.

24. The network appliance of claim 21, wherein the computer program instructions when executed further cause the processor to:

receive from the client, a response generated by the server to the encrypted representation of the data generated by the proxy;

generating a third communication for transmission to the proxy, the third communication including a header specifying the session identifier and the response generated by the client;

responsive to receiving a fourth communication from the proxy that includes the session identifier, correlating, by the network appliance, the fourth communication to the third communication based on the session identifier; and transmitting an encrypted representation of the fourth communication to the server.

25. The network appliance of claim 21, wherein the proxy is implemented in a device remote from the network appliance.

26. The network appliance of claim 21, wherein the computer program instructions when executed further cause the processor to generate the session identifier in response to receiving encrypted data from the client device.

* * * * *